(12) United States Patent
Vetters et al.

(10) Patent No.: US 10,577,939 B2
(45) Date of Patent: Mar. 3, 2020

(54) TURBINE BLADE WITH THREE-DIMENSIONAL CMC CONSTRUCTION ELEMENTS

(71) Applicants: Rolls-Royce Corporation, Indianapolis, IN (US); Rolls-Royce North American Technologies, Inc., Indianapolis, IN (US)

(72) Inventors: Daniel K. Vetters, Indianapolis, IN (US); David J. Thomas, Brownsburg, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 575 days.

(21) Appl. No.: 15/340,684

(22) Filed: Nov. 1, 2016

(65) Prior Publication Data
US 2018/0119549 A1    May 3, 2018

(51) Int. Cl.
*F01D 5/28* (2006.01)
*F01D 5/14* (2006.01)
*F01D 5/30* (2006.01)
*F04D 29/38* (2006.01)

(52) U.S. Cl.
CPC ............ *F01D 5/147* (2013.01); *F01D 5/282* (2013.01); *F01D 5/284* (2013.01); *F01D 5/3007* (2013.01); *F01D 5/3084* (2013.01); *F01D 5/3092* (2013.01); *F04D 29/384* (2013.01); *F05D 2220/32* (2013.01); *F05D 2240/80* (2013.01); *F05D 2300/6012* (2013.01); *F05D 2300/6033* (2013.01)

(58) Field of Classification Search
CPC ........ F01D 5/282; F01D 5/284; F01D 5/3084; F01D 5/3007; F01D 5/147
See application file for complete search history.

(56) References Cited

U.S. PATENT DOCUMENTS

| | | | | |
|---|---|---|---|---|
| 2,783,966 A | * | 3/1957 | Sorensen | F01D 5/284 264/255 |
| 4,113,910 A | * | 9/1978 | Loyd | B29C 66/112 428/162 |
| 4,343,593 A | * | 8/1982 | Harris | F01D 5/282 416/193 A |
| 4,559,005 A | * | 12/1985 | Gants | B29C 70/504 425/363 |
| 4,966,527 A | * | 10/1990 | Merz | B29C 70/202 416/230 |
| 4,992,317 A | * | 2/1991 | Chess | B29C 70/543 428/102 |

(Continued)

FOREIGN PATENT DOCUMENTS

EP    2210733 A1    7/2010
FR    2440831 A1    6/1980

(Continued)

*Primary Examiner* — Ninh H. Nguyen
*Assistant Examiner* — Behnoush Haghighian
(74) *Attorney, Agent, or Firm* — Barnes & Thornburg LLP

(57) ABSTRACT

An ceramic matrix composite blade for use in a gas turbine engine is disclosed. The ceramic matrix composite blade includes a root, an airfoil, and a platform located between the root and the airfoil.

14 Claims, 4 Drawing Sheets

(56) References Cited

U.S. PATENT DOCUMENTS

| | | | |
|---|---|---|---|
| 5,672,417 A * | 9/1997 | Champenois | F01D 5/282 416/230 |
| 5,725,709 A | 3/1998 | Jensen | |
| 5,789,061 A * | 8/1998 | Campbell | B29C 65/564 156/73.1 |
| 7,189,459 B2 * | 3/2007 | Jackson | C04B 41/009 428/446 |
| 7,198,472 B2 * | 4/2007 | McMillan | F01D 5/147 29/889.23 |
| 7,510,379 B2 * | 3/2009 | Marusko | F01D 5/282 29/889.7 |
| 7,549,840 B2 * | 6/2009 | Subramanian | C04B 35/573 29/889.2 |
| 7,972,113 B1 * | 7/2011 | Davies | F01D 5/025 416/214 A |
| 8,100,662 B2 * | 1/2012 | Schreiber | B29C 70/202 416/230 |
| 8,475,895 B2 * | 7/2013 | Xie | F01D 25/005 415/170.1 |
| 8,607,454 B2 * | 12/2013 | Blanchard | B29C 70/24 29/889.21 |
| 8,715,809 B2 | 5/2014 | Ravey | |
| 8,721,290 B2 * | 5/2014 | Darkins, Jr. | B22D 19/0054 416/193 A |
| 8,734,605 B2 * | 5/2014 | Harrison | B29C 66/126 156/242 |
| 8,777,582 B2 * | 7/2014 | Darkins, Jr. | F01D 5/147 416/229 R |
| 8,777,583 B2 * | 7/2014 | Darkins, Jr. | F01D 5/282 416/241 B |
| 8,794,925 B2 * | 8/2014 | McCaffrey | F01D 5/282 416/219 R |
| 8,939,728 B2 * | 1/2015 | McCaffrey | F01D 5/28 416/230 |
| 9,228,445 B2 * | 1/2016 | Darkins, Jr. | F01D 5/147 |
| 9,249,684 B2 * | 2/2016 | Lazur | F01D 25/005 |
| 9,435,209 B2 * | 9/2016 | Garcia Crespo | F01D 5/147 |
| 9,505,145 B2 * | 11/2016 | McCaffrey | F01D 5/28 |
| 9,611,746 B2 * | 4/2017 | Luczak | F01D 5/26 |
| 9,845,688 B2 * | 12/2017 | Thomas | F01D 5/147 |
| 9,963,979 B2 * | 5/2018 | Freeman | F01D 5/284 |
| 10,046,482 B2 * | 8/2018 | Marsal | B29D 99/0025 |
| 10,180,071 B2 * | 1/2019 | Freeman | F01D 5/284 |
| 2005/0158171 A1 * | 7/2005 | Carper | B32B 18/00 415/200 |
| 2007/0148000 A1 | 6/2007 | Marusko et al. | |
| 2008/0220207 A1 | 9/2008 | Ravey | |
| 2011/0027098 A1 | 2/2011 | Noe et al. | |
| 2011/0217166 A1 * | 9/2011 | McMillan | F01D 5/147 415/229 |
| 2011/0229326 A1 | 9/2011 | Papin et al. | |
| 2012/0230829 A1 * | 9/2012 | Benkler | F01D 5/282 416/219 R |
| 2013/0004325 A1 * | 1/2013 | McCaffrey | F01D 5/28 416/241 B |
| 2013/0004326 A1 * | 1/2013 | McCaffrey | F01D 5/147 416/241 B |
| 2013/0011271 A1 * | 1/2013 | Shi | F01D 5/28 416/230 |
| 2013/0064668 A1 * | 3/2013 | Paige, II | F01D 5/284 416/219 R |
| 2014/0212292 A1 * | 7/2014 | Xu | F01D 5/30 416/193 A |
| 2014/0271208 A1 * | 9/2014 | Garcia-Crespo | F01D 5/30 416/194 |
| 2014/0349538 A1 * | 11/2014 | Marchal | B29C 70/24 442/206 |
| 2015/0042023 A1 * | 2/2015 | McCaffrey | F01D 5/28 264/632 |
| 2015/0044050 A1 * | 2/2015 | Thomas | F01D 5/147 416/182 |
| 2015/0050158 A1 * | 2/2015 | Thomas | B23K 1/0018 416/241 R |
| 2015/0192027 A1 * | 7/2015 | Paige | F01D 5/282 416/174 |
| 2015/0345314 A1 | 12/2015 | Davidson et al. | |
| 2016/0146021 A1 * | 5/2016 | Freeman | F01D 5/284 416/95 |
| 2016/0222800 A1 * | 8/2016 | Kleinow | F01D 5/22 |
| 2016/0230568 A1 * | 8/2016 | Sippel | F01D 9/041 |
| 2016/0245100 A1 * | 8/2016 | Luczak | F01D 5/32 |
| 2016/0245103 A1 * | 8/2016 | Gimat | B29B 11/16 |
| 2017/0058912 A1 * | 3/2017 | De Gaillard | B29B 11/16 |
| 2018/0010469 A1 * | 1/2018 | Kadau | F01D 11/08 |
| 2018/0080332 A1 * | 3/2018 | Got | F01D 5/282 |

FOREIGN PATENT DOCUMENTS

| | | |
|---|---|---|
| FR | 2943942 A1 | 10/2010 |
| GB | 1238810 A | 7/1971 |
| JP | 7156888 A | 6/1995 |
| WO | 2010061140 A1 | 6/2010 |
| WO | 2014165467 A1 | 10/2014 |
| WO | 2014197233 A1 | 12/2014 |
| WO | 2015053911 A1 | 4/2015 |
| WO | 2015047485 A3 | 6/2015 |

* cited by examiner

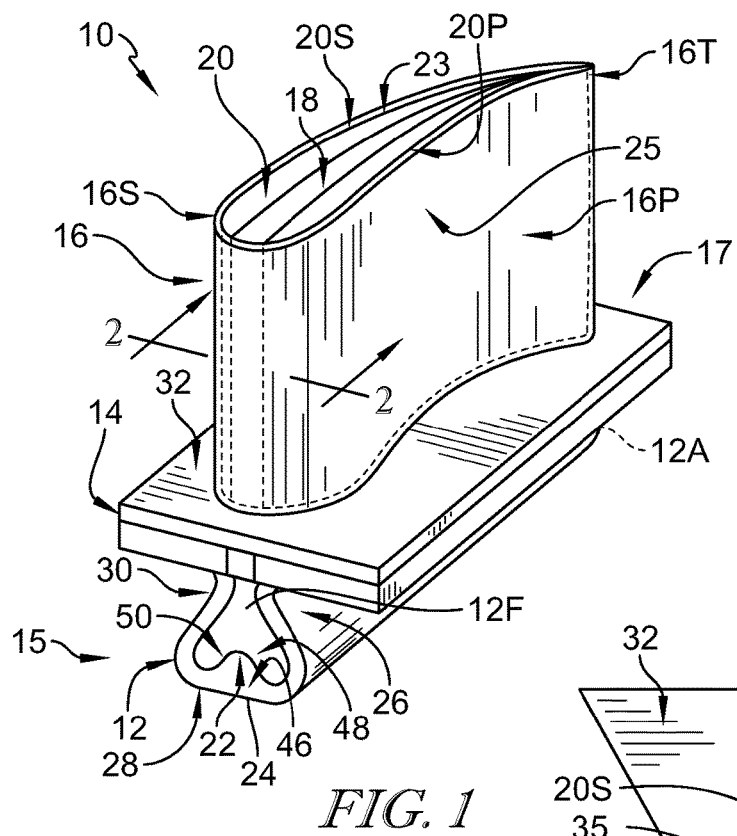
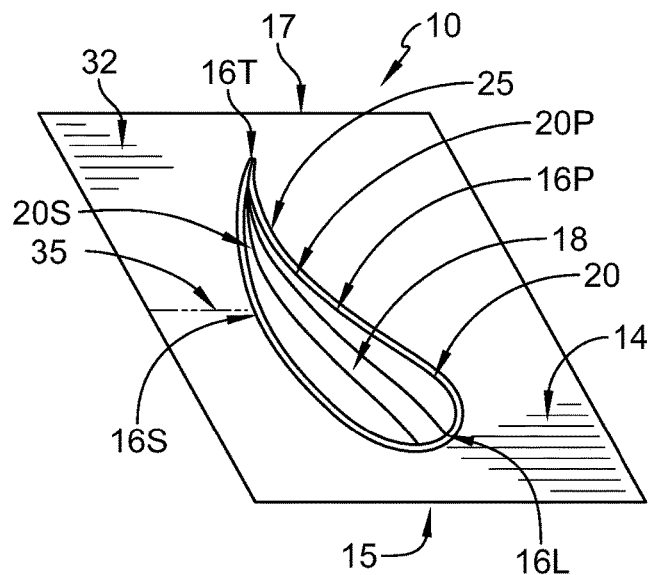
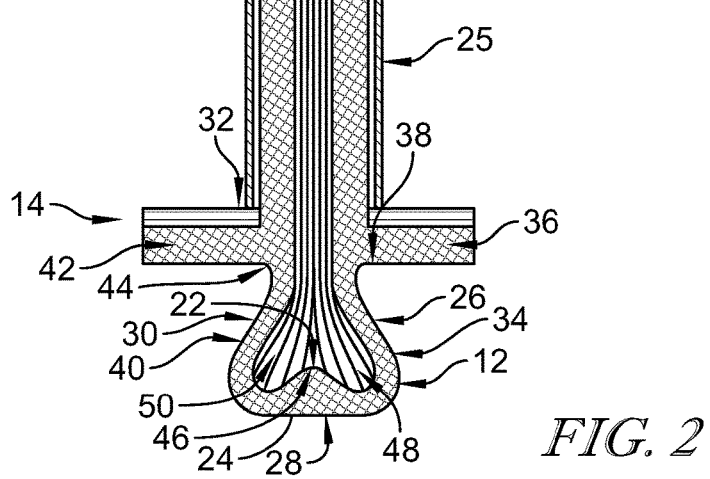

TURBINE BLADE WITH THREE-DIMENSIONAL CMC CONSTRUCTION ELEMENTS

FIELD OF THE DISCLOSURE

The present disclosure relates generally to turbine blades for gas turbine engines, and more specifically to turbine blades comprising ceramic-containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high-pressure air to the combustor. In the combustor, fuel is mixed with the high-pressure air and is ignited. Hot, high-pressure products of the combustion reaction in the combustor are directed into the turbine where work is extracted to drive the compressor and, sometimes, an output shaft. Leftover products of the combustion are exhausted out of the turbine and may provide thrust in some applications.

Turbine blades interact with the hot, high-pressure products of the combustor and convert them to mechanical rotation. The interaction of combustion products with the blades heats the blades. Turbine blades are often made from high-temperature compatible materials and/or are actively cooled by supplying relatively cool air to the turbine blades. To this end, some airfoils incorporate composite materials or heat shields to withstand very high temperatures. Design and manufacture of turbine blades from composite materials presents challenges because of the geometry and strength required for the parts.

SUMMARY

The present disclosure may comprise one or more of the following features and combinations thereof.

According to an aspect of the present disclosure, a ceramic matrix composite blade adapted for use in a gas turbine engine is disclosed. The blade has a root, a platform, and an airfoil. The blade includes a core having a proximal end and a distal end. The core comprises two-dimensional reinforcing fibers in a ceramic matrix material.

In illustrative embodiments, the blade includes a wrap. The wrap comprises three-dimensional reinforcing fibers in a ceramic matrix material. The wrap is arranged to extend under the proximal end of the core to form an outer surface of the root. The wrap is configured to contact a disk when the ceramic matrix composite blade is assembled into a turbine wheel.

In illustrative embodiments, the wrap extends outwardly away from the core to form at least a portion of the platform. The core may be exposed between a pressure-side section and suction side section of the wrap along a leading edge of the airfoil. The core may be exposed between a pressure-side section and suction side section of the wrap along a trailing edge of the airfoil.

In illustrative embodiments, the two-dimensional reinforcing fibers of the core are unbalanced. In some embodiments, the core includes more fibers that extend from the proximal end to the distal end of the core than fibers that across the core.

In illustrative embodiments, the blade includes a platform ply arranged to overlie the platform without extending upwardly into the airfoil or downwardly into the root. The platform ply comprises one of a one-dimensional ply of reinforcing fibers, a two-dimensional ply of reinforcing fibers, a three-dimensional ply of reinforcing fibers, a mat ply of reinforcing fibers, and a conversion layer (i.e. a carbon mat).

In illustrative embodiments, the platform ply may be arranged to surround the airfoil. The platform play may include a slit joint that extends from the airfoil to an edge of the platform at a location having the smallest distance from the airfoil to the edge of the platform.

In illustrative embodiments, the wrap further includes a pressure side section extending upwardly from the platform towards a distal end and a suction side section extending upwardly from the platform towards the distal end to locate a portion of the core therebetween. In some embodiments, the wrap may further include a first tip shroud section located spaced-apart platform and extending outwardly away from the core.

In illustrative embodiments, the blade may include an airfoil ply. The airfoil ply may extend around the leading edge of the airfoil and may form a seam along the trailing edge of the airfoil. The airfoil ply may terminate at the platform and may not extend downwardly into the platform or root.

In illustrative embodiments, the wrap includes a first section, a second section, and a third section that cooperate to extend around the proximal end of the core. The second section is arranged to extend under the proximal end of the core and extends between/interconnects the first section and the third section. Each of the first section and the third section extends upwardly away from the second section from the proximal end towards a distal end to locate the proximal end of the core therebetween.

In illustrative embodiments, the second section includes a spreader. The spreader extends into the proximal end of the core to locate a first portion of the core between the spreader and the first section of the wrap and a second portion of the core between the spreader and the third section of the wrap.

According to another aspect of the present disclosure, a ceramic matrix composite blade is taught. The blade is formed of a wrap of three-dimensional woven reinforcement in a ceramic matrix composite. The wrap may be shaped to form a root configured to be retained in a disk when the blade is assembled into a turbine wheel, a platform arranged to define a portion of a gas path, and an airfoil shaped to interact with air passing through the gas path.

In illustrative embodiments, the wrap is arranged to define a forward seam that extends along only the root and an aft seam that extends along the root, the platform, and the airfoil. The wrap may be arranged to form a leading edge of the airfoil.

In illustrative embodiments, the airfoil further includes an airfoil core located within the airfoil formed by the wrap. The airfoil core may be formed of two-dimensional woven reinforcement in a ceramic matrix composite. In some embodiments, two-dimensional reinforcing fibers of the core may be unbalanced such that that the core includes more fibers that extend from the proximal end to the distal end of the core than fibers that across the core.

According to another aspect of the present disclosure, a method for forming a ceramic matrix composite blade having a root, a platform, and an airfoil is disclosed. The method may include forming a sheet comprising three-dimensional woven fibers, the sheet formed to include a root portion, a platform portion, and an airfoil portion. The method may also include removing a portion of the platform portion to form a groove in a wrap preform, folding the wrap preform to form a forward seam that extends along only the root and an aft seam that extends along the root, the platform, and the airfoil, and processing the wrap preform with a matrix material to form the ceramic matrix composite blade.

In illustrative embodiments, the step of folding includes folding the wrap preform around an airfoil core comprising two-dimensional woven fabric. In some embodiments, the matrix material may be applied to the wrap preform by a method selected from the group consisting of chemical vapor infiltration, melt infiltration, sintering, pyrolysis, and combinations thereof.

These and other features of the present disclosure will become more apparent from the following description of the illustrative embodiments.

BRIEF DESCRIPTION OF THE DRAWINGS

FIG. 1 is a perspective view of a ceramic matrix composite turbine blade in accordance with the present disclosure showing that the ceramic matrix composite blade includes a root, an airfoil extending from the root, and a platform located between the airfoil and the root;

FIG. 2 is a sectional view taking along line 2-2 of FIG. 1, showing the ceramic matrix composite blade includes a core including a two-dimensional fabric reinforcements and a wrap including a three-dimensional woven fabric reinforcements surrounding the core and further showing the wrap is arranged to form an outer surface of the root;

FIG. 3 is top-plan view of the ceramic matrix composite blade of FIGS. 1 and 2, showing the core forms a leading edge and a trailing edge of the airfoil, and further showing a platform ply of two-dimensional fabric reinforcement surrounding the airfoil;

DETAILED DESCRIPTION OF THE DRAWINGS

Figure 4:
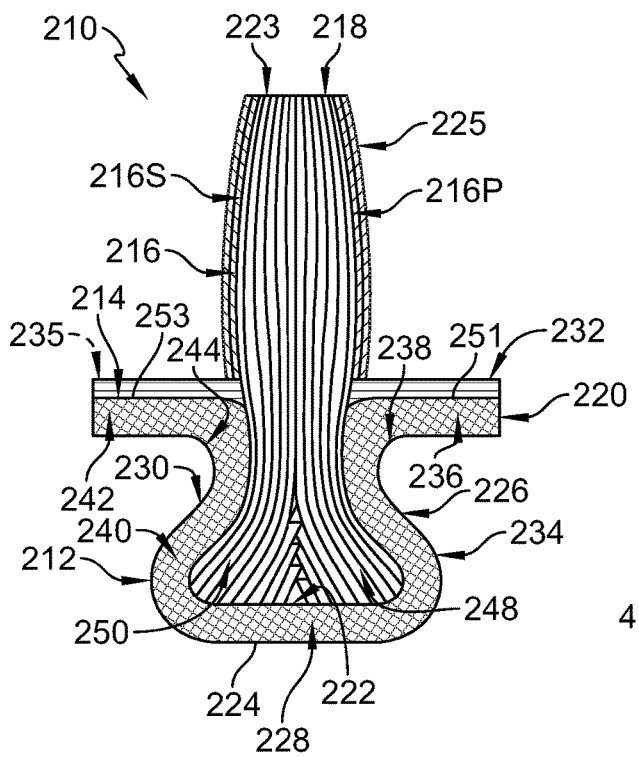
FIG. 4 is a sectional view of another embodiment of a ceramic matrix composite blade in accordance with the present disclosure, showing a wrap of three-dimensional woven fabric reinforcement wraps around a core of two-dimensional fabric reinforcements and forms the platform of the ceramic matrix composite blade.

For the purposes of promoting an understanding of the principles of the disclosure, reference will now be made to a number of illustrative embodiments illustrated in the drawings and specific language will be used to describe the same.

An illustrative ceramic matrix composite turbine blade 10 adapted for use in a gas turbine engine is shown in FIG. 1. The ceramic matrix composite blade 10 includes a root 12, a platform 14, and an airfoil 16 extending from the platform 14 as shown in FIG. 1. Illustratively, the root 12 is configured to couple the ceramic matrix composite blade 10 to a rotor for rotation about a central axis of a gas turbine engine and block gasses from moving around the airfoil 16 toward the root 12. The platform 14 is arranged around the airfoil 16 and is configured to define a gas path in the gas turbine engine. The airfoil 16 is spaced-apart radially from the root 12 and is shaped to interact with air flowing through the gas path.

The ceramic matrix composite (CMC) blade 10 comprises reinforcement fibers in the form of a core 18 and a wrap 20, as shown in FIGS. 1-3. The wrap 20 is arranged to extend around a proximal end 22 of the core 18, as shown in FIGS. 1 and 2 and extend along the entirety of the core 18 from a forward end 15 of the core towards an aft end 17, as shown in FIG. 1. In the illustrative embodiment, the core 18 comprises a two-dimensional fabric of reinforcing fibers in a ceramic matrix material, which provide the core 18 with fibers oriented in a radial direction to carry centripetal loads. In some embodiments, the wrap 20 comprises a three-dimensional fabric of reinforcing fibers in a ceramic matrix material. In some embodiments, the three-dimensional fibers may enable the complex geometry associated with the root 12 and the platform 14.

In some embodiments, the three-dimensional fabric fibers may be formed on a loom or braider capable of controlling the amount and position of the fiber in three axes. Illustratively, the fibers are added or dropped out of the reform via a control program to form the desired shape. In the alternative, the three-dimensional fabric may be formed by weaving to control the amount of fiber in each of the three directions. In some embodiments, a high fraction of radial fibers may be used. In some other embodiments, a balanced fiber distribution may be used. In some other embodiments, a high circumferential fraction may be used.

Portions of the core 18 and the wrap 20 cooperate to form the airfoil 16 as shown in FIGS. 1 and 2. The airfoil 16 includes a leading edge 16L, a trailing edge 16T, a pressure side 16P, and a suction side 16S as shown in FIG. 1. In some embodiments, the wrap 20 includes a pressure side section 20P that forms the pressure side 16P and a suction side section 20S the forms the suction side 16S. In some embodiments, the core 18 is exposed between sides 16P, 16S of wrap 20 along the leading edge 16L and the trailing edge 16T of the airfoil 16 for overwrap by an airfoil ply 25. In other embodiments, the core 18 may be tapered such that the pressure side section 20P and the suction side section 20S of the wrap 20 come together to form a joint at one or both of the leading edge 16L and the trailing edge 16T of the airfoil 16. The pressure side section 20P and the suction side section 20S of the wrap 20 cooperate to locate a portion of the core 18 therebetween. Illustratively, each of the suction side section 20S and the pressure side section 20P extend from the leading edge 16L to the trailing edge 16T.

The wrap 20 forms the outer surface 24 of the root 12, as shown in FIGS. 1 and 2. The wrap 20 includes a first section 26, a second section 28, and a third section 30. Each of the first section 26 and the third section 30 extends away from the proximal end 22 of the core 18 towards a distal end 23 of the ceramic matrix composite blade 10. The second section 28 is arranged to extend under the proximal end 22 of the core 18 and interconnect the first section 26 and the second section 28. The first section 26, the second section 28, and the third section 30 cooperate to extend around the proximal end 22 of the core 18 to form the outer surface 24 of the root 12, as shown in FIGS. 1 and 2.

The first section 26 is coupled to the pressure side section 20P and includes a first band 34, a first strip 36, and a first platform mount 38 as shown in FIG. 2. The first band 34 extends between and interconnects the second section 28 and the first platform mount 38. The first platform mount 38 extends between the first band 34 and the first strip 36. The first strip 36 extends outwardly away from the first platform mount 38 to form a portion of the platform 14. Each of the first band 34, the first strip 36, and the first platform mount 38 extend from a forward side 15 to an aft side 17 of the ceramic matrix composite blade 10.

The third section 30 is coupled to the suction side section 20S and includes a second band 40, a second strip 42, and a second platform mount 44 as shown in FIG. 2. The second band 40 extends between and interconnects the second section 28 and the second platform mount 44. The second platform mount 44 extends between the second band 40 and the second strip 42. The second strip 42 extends outwardly away from the second platform mount 44 to form a portion of the platform 14.

The platform 14 comprises a portion of each of the first section 26 and the third section 30 and a platform ply 32, as shown in FIGS. 1-3. Each of the first strip 36 and the second strip 42 extend outwardly away from the core 18 as shown in FIGS. 1-3. The platform ply 32 is arranged to overlie the first strip 36 and the second strip 42 and surround the core 18 as shown in FIGS. 1 and 3. The platform ply 32 includes a slit joint 35 that extends from the airfoil 16 to an edge of the platform 14 at a location having the smallest distance from the airfoil 16 to the edge of the platform 14. Illustratively, the platform ply 32 defines the gas path when the ceramic matrix composite blade 10 is in the gas turbine engine. In some embodiments, the platform ply 32 comprises a two-dimensional fabric of reinforcing fibers in a ceramic matrix material. In other embodiments, the platform ply 32 may comprise a one-dimensional fabric of reinforcing fibers, a three-dimensional fabric of reinforcing fibers, a mat of reinforcing fibers, or a conversion layer (i.e. a smooth machinable carbon mat).

The second section 28 extends between and interconnects the first section 26 and the third section 30 as shown in FIGS. 1 and 2. In some embodiments, the second section 28 includes a spreader 46 extending into the proximal end 22 of the core 18, as shown in FIG. 2. The spreader 46 locates a first portion 48 of the core between the spreader 46 and the first section 26 of the wrap 20 and a second portion 50 of the core 18 between the spreader 46 and the third section 30 of the wrap 20. By spreading the core 18 such that plies are turned as shown in FIG. 2, at least some radial forces applied to plies of the core 18 can be transmitted to a disk directly without being passed interlaminarly to another ply. This can increase the effective loading capability of the blade 10. Also, including the spreader in the wrap 20 may decrease the defects associated with fillers (sometimes provided by noodles, loose fibers, etc) or the potential defects of using two-dimensional or one-dimensional fibers.

In the illustrative embodiment, the blade 10 also includes an airfoil ply 25 as shown in FIG. 1. The airfoil ply 25 extends around the leading edge of the airfoil 16 and forms a seam along the trailing edge of the airfoil 16. The illustrative airfoil ply 25 terminates at the platform 14 and does not extend downwardly into the platform 14 or root 12. The airfoil ply 25 may comprise a one-dimensional fabric of reinforcing fibers, two-dimensional fabric of reinforcing fibers, a three-dimensional fabric of reinforcing fibers, or a mat or a conversion layer of reinforcing fibers.

Another illustrative ceramic matrix composite blade 210 adapted for use in a gas turbine engine is shown in FIG. 4. The ceramic matrix composite blade 210 includes a root 212, a platform 214, and an airfoil 216. The root 212 is configured to attach the ceramic matrix composite blade 210 to a gas turbine engine. The platform 214 is configured to define a portion of a gas path when the ceramic matrix composite blade 210 is in the gas turbine engine. The airfoil 216 extends away from the platform to interact with air passing through the gas path.

The ceramic matrix composite blade 210 comprises reinforcement fibers in the form of a core 218 and a wrap 220, as shown in FIG. 4. The wrap 220 is arranged to extend around a proximal end 222 of the core 218, as shown in FIG. 4 and extend along the entirety of the core 218 from a forward end of the core towards an aft end. Illustratively, the wrap 220 is configured to form the platform 214 and a portion of the root 212.

In some embodiments, the core 218 comprises a two-dimensional fabric of reinforcing fibers in a ceramic matrix material, which provide the core 218 with fibers oriented in a radial direction to carry centripetal loads. In some embodiments, the wrap 220 comprises a three-dimensional fabric of reinforcing fibers in a ceramic matrix material. In some embodiments, the three-dimensional fibers may enable the complex geometry associated with the root 212 and the platform 214.

The core 218 extends upwardly from the platform 214 to form the airfoil 216 as shown in FIG. 4. The airfoil 216 includes a leading edge, a trailing edge, a pressure side 216P, and a suction side 216S. In the illustrative embodiment, the blade 210 also includes an airfoil ply 225 wrapped around the core 218. The airfoil ply 225 extends around the leading edge of the airfoil 216 and forms a seam along the trailing edge of the airfoil 216. The illustrative airfoil ply 225 terminates at the platform 214 and does not extend downwardly into the platform 214 or root 212. The airfoil ply 225 may comprise a one-dimensional fabric of reinforcing fibers, two-dimensional fabric of reinforcing fibers, a three-dimensional fabric of reinforcing fibers, or a mat or a conversion layer of reinforcing fibers.

The wrap 220 forms the outer surface 224 of the root 212 as shown in FIG. 4. The wrap 220 includes a first section 226, a second section 228, and a third section 230. Each of the first section 226 and the third section 230 extends away from the proximal end 222 of the core 218 towards a distal end 223 of the ceramic matrix composite blade 210. The second section 228 is arranged to extend under the proximal end 222 of the core 218 and interconnect the first section 226 and the second section 228. The first section 226, the second section 228, and the third section 230 cooperate to extend around the proximal end 222 of the core 218 to form the outer surface 224 of the root 212 as shown in FIG. 4.

The first section 226 includes a first band 234, a first strip 236, and a first platform mount 238 as shown in FIG. 4. The first band 234 extends between and interconnects the second section 228 and the first platform mount 238. The first platform mount 238 extends between the first band 234 and the first strip 236. The first strip 236 extends outwardly away from the first platform mount 238 to form a portion of the platform 214. Each of the first band 234, the first strip 236, and the first platform mount 238 extend from a forward side to an aft side of the ceramic matrix composite blade 210.

The third section 230 includes a second band 240, a second strip 242, and a second platform mount 244 as shown in FIG. 4. The second band 240 extends between and interconnects the second section 228 and the second platform mount 244. The second platform mount 244 extends between the second band 240 and the second strip 242. The second strip 242 extends outwardly away from the second platform mount 244 to form a portion of the platform 214.

The platform 214 comprises a portion of each of the first section 226 and the third section 230 along with a platform ply 232 as shown in FIG. 4. In some embodiments, each of the first strip 236 and the second strip 242 extend outwardly away from the core 218 as shown in FIG. 4 to form the platform 214.

The platform ply 232 is arranged to overlie the first strip 236 and the second strip 242 and surround the core 218. The platform ply 232 includes a slit joint 235 that extends from the airfoil 216 to an edge of the platform 214 at a location having the smallest distance from the airfoil 216 to the edge of the platform 214. Illustratively, the platform ply 232 defines the gas path when the ceramic matrix composite blade 210 is in the gas turbine engine. In some embodiments, the platform ply 232 comprises a two-dimensional fabric of reinforcing fibers in a ceramic matrix material. In other embodiments, the platform ply 232 may comprise a one-dimensional fabric of reinforcing fibers, a three-dimensional fabric of reinforcing fibers, or a mat or a conversion layer of reinforcing fibers.

The second section 228 extends between and interconnects the first section 226 and the third section 230 as shown in FIG. 4. The second section 228 forms a bottom of the root 212. In some embodiments, a first portion 248 of the core is located between the second section 228 and the first platform mount 238 and a second portion 250 of the core is located between the second section 228 and the second platform mount 244. Illustratively, the second section 228 cooperates with the first section 226, the second section 228 and the proximal end 222 of the core to form a dovetail shape as shown in FIG. 4

Figure 5:
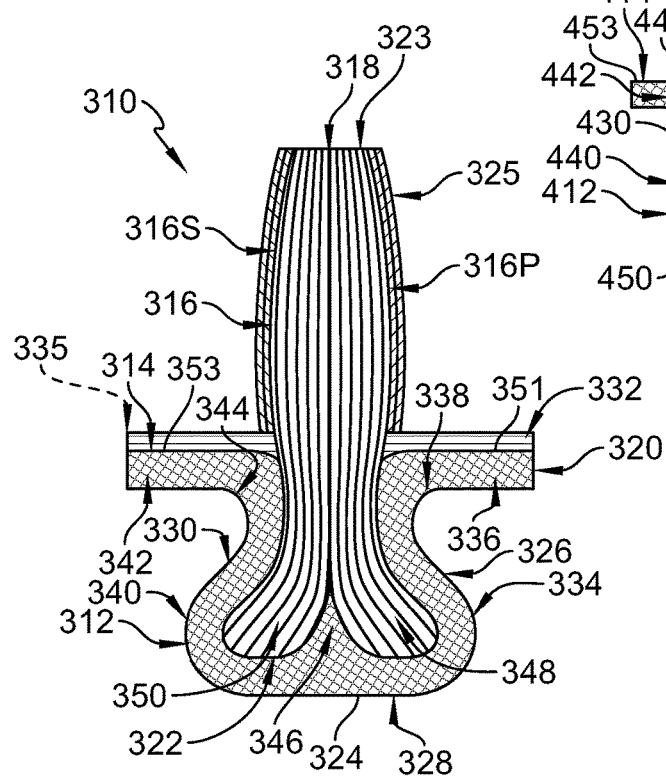
FIG. 5 is a sectional view of another embodiment of a ceramic matrix composite blade in accordance with the present disclosure, showing a wrap of three-dimensional woven fabric reinforcement wraps around a core of two-dimensional fabric reinforcements and is formed to include a spreader that extends into a proximal end of the core.

Another illustrative ceramic matrix composite blade 310 adapted for use in a gas turbine engine is shown in FIG. 5. The ceramic matrix composite blade 310 includes a root 312, a platform 314, and an airfoil 316. The root 312 is configured to attach the ceramic matrix composite blade 310 to a gas turbine engine. The platform 314 is configured to define a portion of a gas path when the ceramic matrix composite blade 310 is in the gas turbine engine. The airfoil 316 extends away from the platform to interact with air passing through the gas path.

The ceramic matrix composite blade 310 comprises reinforcement fibers in the form of a core 318 and a wrap 320, as shown in FIG. 5. The wrap 320 is arranged to extend around a proximal end 322 of the core 318, as shown in FIG. 5 and extend along the entirety of the core 318 from a forward end of the core towards an aft end.

Illustratively, the wrap 320 cooperates with a platform ply 232 to form the platform 314 and a portion of the root 312. The platform ply 332 is arranged to overlie the first strip 336 and the second strip 342 and surround the core 318. The platform ply 332 includes a slit joint 335 that extends from the airfoil 316 to an edge of the platform 314 at a location having the smallest distance from the airfoil 16 to the edge of the platform 314. Illustratively, the platform ply 332 defines the gas path when the ceramic matrix composite blade 310 is in the gas turbine engine. In some embodiments, the platform ply 332 comprises a two-dimensional fabric of reinforcing fibers in a ceramic matrix material. In other embodiments, the platform ply 332 may comprise a one-dimensional fabric of reinforcing fibers, a three-dimensional fabric of reinforcing fibers, or a mat or a conversion layer of reinforcing fibers.

In some embodiments, the core 318 comprises a two-dimensional fabric of reinforcing fibers in a ceramic matrix material, which provide the core 318 with fibers oriented in a radial direction to carry centripetal loads. In some embodiments, the wrap 320 comprises a three-dimensional fabric of reinforcing fibers in a ceramic matrix material. In some embodiments, the three-dimensional fibers may enable the complex geometry associated with the root 312 and the platform 314.

The core 318 extends upwardly from the platform 314 as shown in FIG. 5. The airfoil 316 includes a leading edge, a trailing edge, a pressure side 316P, and a suction side 316S formed by an airfoil ply 325 wrapped around the core 318. The airfoil ply 325 extends around the leading edge of the airfoil 316 and forms a seam along the trailing edge of the airfoil 316. The illustrative airfoil ply 325 terminates at the platform 314 and does not extend downwardly into the platform 314 or root 312. The airfoil ply 325 may comprise a one-dimensional fabric of reinforcing fibers, two-dimensional fabric of reinforcing fibers, a three-dimensional fabric of reinforcing fibers, or a mat or a conversion layer of reinforcing fibers.

The wrap 320 forms the outer surface 324 of the root 312 as shown in FIG. 5. The wrap 320 includes a first section 326, a second section 328, and a third section 330. Each of the first section 326 and the third section 330 extends away from the proximal end 322 of the core 318 towards a distal end 323 of the ceramic matrix composite blade 310. The second section 328 is arranged to extend under the proximal end 322 of the core 318 and interconnect the first section 326 and the second section 328. The first section 326, the second section 328, and the third section 330 cooperate to extend around the proximal end 322 of the core 318 to form the outer surface 324 of the root 312 as shown in FIG. 5.

The first section 326 includes a first band 334, a first strip 336, and a first platform mount 338 as shown in FIG. 5. The first band 334 extends between and interconnects the second section 328 and the first platform mount 338. The first platform mount 338 extends between the first band 334 and the first strip 336. The first strip 336 extends outwardly away from the first platform mount 338 to form a portion of the platform 314. Each of the first band 334, the first strip 336, and the first platform mount 338 extend from a forward side to an aft side of the ceramic matrix composite blade 310.

The third section 330 includes a second band 340, a second strip 342, and a second platform mount 344 as shown in FIG. 5. The second band 340 extends between and interconnects the second section 328 and the second platform mount 344. The second platform mount 344 extends between the second band 340 and the second strip 342. The second strip 342 extends outwardly away from the second platform mount 344 to form a portion of the platform 314.

The platform 314 comprises a portion of each of the first section 326 and the third section 330 along with platform ply 232 as shown in FIG. 5. In some embodiments, each of the first strip 336 and the second strip 342 extend outwardly away from the core 318 as shown in FIG. 5 to form the platform 314.

The second section 328 extends between and interconnects the first section 326 and the third section 330 as shown in FIG. 4. In some embodiments, the second section 328 includes a spreader 346 extending into the proximal end 322 of the core 318 as shown in FIG. 5. The spreader 346 locates a first portion 348 of the core between the spreader 346 and the first section 326 of the wrap 320 and a second portion 350 of the core 318 between the spreader 346 and the third section 330 of the wrap 320.

Figure 6:
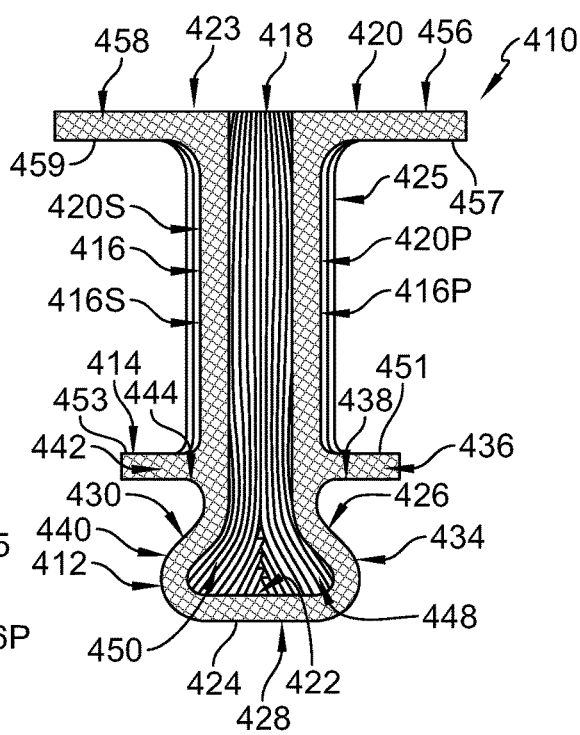
FIG. 6 is a sectional view of another embodiment of a ceramic matrix composite blade in accordance with the present disclosure, showing a wrap of three-dimensional woven fabric reinforcement extends around a core of two-dimensional fabric reinforcements from a proximal end of the ceramic matrix composite blade to a distal end of the ceramic matrix composite blade and the wrap is arranged to form a shroud at the distal end of the ceramic matrix composite blade.

Another illustrative ceramic matrix composite blade 410 adapted for use in a gas turbine engine is shown in FIG. 6. The ceramic matrix composite blade 410 includes a root 412, a platform 414, and an airfoil 416. The root 412 is configured to attach the ceramic matrix composite blade 410 to a gas turbine engine. The platform 414 is configured to define a portion of a gas path when the ceramic matrix composite blade 410 is in the gas turbine engine. The airfoil 416 extends away from the platform to interact with air passing through the gas path.

The ceramic matrix composite blade 410 comprises reinforcement fibers in the form of a core 418 and a wrap 420, as shown in FIG. 6. The wrap 420 is arranged to extend around a proximal end 422 of the core 418, as shown in FIG. 6 and extend along the entirety of the core 418 from a forward end of the core towards an aft end. Illustratively, the wrap 420 is configured to form the platform 414 and a portion of the root 412.

In some embodiments, the core 418 comprises a two-dimensional fabric of reinforcing fibers in a ceramic matrix material, which provide the core 418 with fibers oriented in a radial direction to carry centripetal loads. In some embodiments, the wrap 420 comprises a three-dimensional fabric of reinforcing fibers in a ceramic matrix material. In some embodiments, the three-dimensional fibers may enable the complex geometry associated with the root 412 and the platform 414.

Portions of the core 418 and the wrap 420 cooperate to form the airfoil 416 as shown in FIG. 6. The airfoil 416 includes a leading edge, a trailing edge, a pressure side 416P, and a suction side 416S as shown in FIG. 6. In some embodiments, the wrap 420 includes a pressure side section 420P that forms the pressure side 416P and a suction side section 420S the forms the suction side 416S of the airfoil 416. The pressure side section 420P and the suction side section 420S of the wrap 420 cooperate to locate a portion of the core 418 therebetween. Illustratively, each of the suction side section 420S and the pressure side section 420P extends from the leading edge to the trailing edge.

The wrap 420 forms the outer surface 424 of the root 412, as shown in FIG. 6. The wrap 420 includes a first section 426, a second section 428, and a third section 430. Each of the first section 426 and the third section 430 extends away from the proximal end 422 of the core 418 towards a distal end 423 of the ceramic matrix composite blade 410. The second section 428 is arranged to extend under the proximal end 422 of the core 418 and interconnect the first section 426 and the second section 428. The first section 426, the second section 428, and the third section 430 cooperate to extend around the proximal end 422 of the core 418 to form the outer surface 424 of the root 412 as shown in FIG. 6.

The first section 426 is coupled to the pressure side section 420P and includes a first band 434, a first strip 436, and a first platform mount 438 as shown in FIG. 6. The first band 434 extends between and interconnects the second section 428 and the first platform mount 438. The first platform mount 438 extends between the first band 434 and the first strip 436. The first strip 436 extends outwardly away from the first platform mount 438 to form a portion of the platform 414. Each of the first band 434, the first strip 436, and the first platform mount 438 extend from a forward side to an aft side of the ceramic matrix composite blade 410. Illustratively, a top surface 451 the first strip 436 is arranged to define a gas path when the ceramic matrix composite blade 410 is located in a gas turbine engine.

The third section 430 is coupled to the suction side section 420S includes a second band 440, a second strip 442, and a second platform mount 444 as shown in FIG. 6. The second band 440 extends between and interconnects the second section 428 and the second platform mount 444. The second platform mount 444 extends between the second band 440 and the second strip 442. The second strip 442 extends outwardly away from the second platform mount 444 to form a portion of the platform 414. Illustratively, a top surface 453 the second strip 442 is arranged to define a gas path when the ceramic matrix composite blade 410 is located in a gas turbine engine.

The platform 414 comprises a portion of each of the first section 426 and the third section 430, as shown in FIG. 6. In some embodiments, each of the first strip 436 and the second strip 442 extend outwardly away from the core 418 as shown in FIG. 6 to form the platform 414.

The second section 428 extends between and interconnects the first section 426 and the third section 430 as shown in FIG. 6. The second section 428 forms a bottom of the root 412. In some embodiments, a first portion 448 of the core is located between the second section 428 and the first platform mount 438 and a second portion 450 of the core is located between the second section 428 and the second platform mount 444. Illustratively, the second section 428 cooperates with the first section 426, the second section 428 and the proximal end 422 of the core to form a dovetail shape as shown in FIG. 6.

The wrap 420 further includes a first shroud section 456 and a second shroud section 458 as shown in FIG. 6 located at a distal end 423 of the ceramic matrix composite blade 410. The first shroud section 456 and the second shroud section 458 locate a portion of the core 418 therebetween. Each of the first shroud section 456 and the second shroud section 458 cooperate with the platform 414 to define the gas path when the ceramic matrix composite blade 410 is located in a gas turbine engine.

The first shroud section 456 is coupled to the pressure side section 420P, as shown in FIG. 6, to locate the pressure side section 420P between the first shroud section 456 and the platform 414. The first shroud section 456 includes a bottom surface 457 arranged to face the top surface 451 of the first strip 436. The bottom surface 457 cooperates with the top surface 451 to define the gas path.

The second shroud section 458 is coupled to the suction side section 420S, as shown in FIG. 6, to locate the suction side section 420S between the second shroud section 458 and the platform 414. The second shroud section 458 includes a bottom surface 459 arranged to face the top surface 453 of the second strip 442. The bottom surface 459 cooperates with the top surface 453 to define the gas path.

In the illustrative embodiment, the blade 410 also includes an optional airfoil ply 425 as shown in FIG. 6. The airfoil ply 425 extends around the leading edge of the airfoil 16 and forms a seam along the trailing edge of the airfoil 416. The illustrative airfoil ply 425 terminates at the platform 414 and does not extend downwardly into the platform 414 or root 412. The airfoil ply 425 may comprise a one-dimensional fabric of reinforcing fibers, two-dimensional fabric of reinforcing fibers, a three-dimensional fabric of reinforcing fibers, or a mat or a conversion layer of reinforcing fibers.

Figure 7:
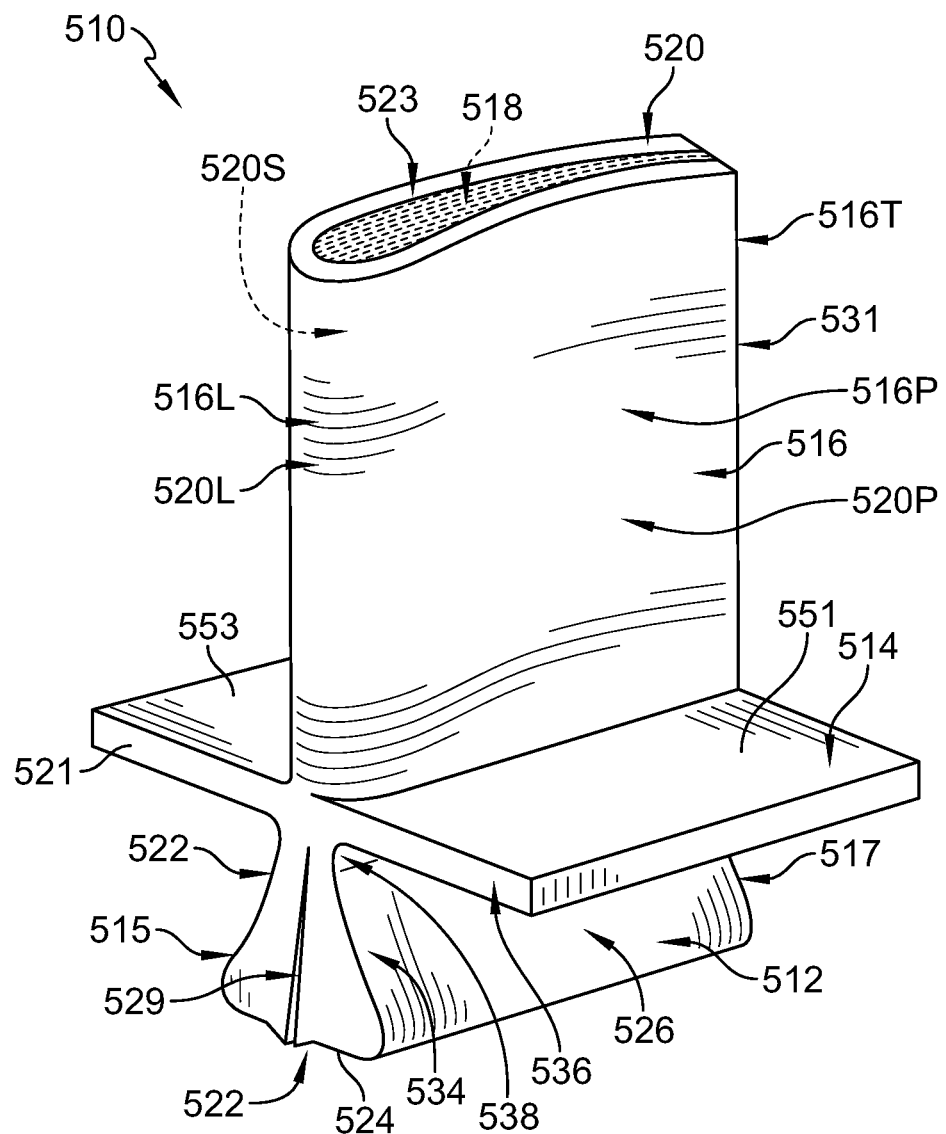
FIG. 7 is a perspective view of another embodiment of a ceramic matrix composite blade in accordance with the present disclosure, showing a wrap of three-dimensional woven fabric reinforcement shaped to form a root, a platform, and an airfoil, and further showing the wrap forms a forward seam along only a forward surface of the root.

Another illustrative ceramic matrix composite blade 510 adapted for use in a gas turbine engine is shown in FIG. 7. The ceramic composite blade 510 includes a root 512, a platform 514, and an airfoil 516. The root 512 is configured to attach the ceramic matrix composite blade 510 to a gas turbine engine. The platform 514 is configured to define a portion of a gas path when the ceramic matrix composite blade 510 is located in the gas turbine engine. The airfoil 516 extends away from the platform 514 and is configured to interact with air passing through the gas path when the ceramic matrix composite blade 510 is located in the gas turbine engine.

The ceramic matrix composite blade 510 comprises a wrap 520 and optionally a core 518, sometimes called an airfoil core 518, as shown in FIG. 7. In some embodiments, the wrap 520 extends around the core 518 and forms a leading edge 516L of the airfoil 516. In some embodiments, the core 518 comprises a two-dimensional fabric of reinforcing fibers in a ceramic matrix material. In some embodiments, the wrap 520 comprises a three-dimensional fabric of reinforcing fibers in a ceramic matrix material.

The wrap 520 forms the root 512 as shown in FIG. 7. The wrap 520 includes a first root section 526, and a second root section 528, and a forward seam 529 as shown in FIG. 7. The first root section 526 and the second root section 528 each extend from a forward end 515 towards an aft end 517. The forward seam is located between the first root section and the second root section 528 and extends vertically from a proximal end 522 of the root 512 to the platform 514. Illustratively, the wrap 520 forms the outer surface 524 of the root 512 as shown in FIG. 7.

The first root section 526 includes a first band 534, a first strip 536, and a first platform mount 538 as shown in FIG. 7. The first band 534 is coupled to the first platform mount 538 and is arranged to form a portion of the outer surface 524 of the root 512. The first platform mount 538 extends between the first band 534 and the first strip 536. The first strip 536 extends outwardly away from the first platform mount 538 to form a portion of the platform 514. Each of the first band 534, the first strip 536, and the first platform mount 538 extend from the forward side 515 to the aft side 517 of the ceramic matrix composite blade 510. Illustratively, a top surface 551 the first strip 536 is arranged to define a portion of the gas path when the ceramic matrix composite blade 510 is located in a gas turbine engine.

The second root section 528 includes a second band, a second strip, and a second platform mount similar to the first band 534, the first strip 536, and the first platform mount 538 as shown in FIG. 7. The second band is coupled to the second platform mount and is arranged to form a portion of the outer surface 524 of the root 512. The second platform mount extends between the second band and the second strip. The second strip extends outwardly away from the second platform mount to form a portion of the platform 514. Each of the second band, the second strip, and the second platform mount extend from the forward side 515 to the aft side 517 of the ceramic matrix composite blade 510. Illustratively, a top surface 553 the second strip is arranged to define a portion of the gas path when the ceramic matrix composite blade 510 is located in a gas turbine engine.

The platform 514 comprises a portion of each of the first root section 526 and the second root section 528 as shown in FIG. 7. In some embodiments, each of the first strip 536 and the second strip extend outwardly away from the core 518 as shown in FIG. 7 to form the platform 514. The platform 514 is formed to include a continuous front face 521 that extends the width of the platform 514 as shown in FIG. 7.

The airfoil 516 extends from the platform 514 towards the distal end 523. The airfoil 516 includes a pressure side 516P, a suction side 516S, a leading edge 516L, and a trailing edge 516T. Each of the pressure side 516P and the suction side 516S extends from the leading edge 516L to the trailing edge 516T.

The wrap 520 forms the outer surface of each of the pressure side 516P, the suction side 516S, the leading edge 516L, and an aft end seam 531. The wrap 520 includes a pressure side section 520P, a suction side section 520S, and a leading edge section 520L as shown in FIG. 7. The pressure side section 520P is arranged to form the pressure side 516P of the airfoil 516. The suction side section 520S is arranged to form the suction side 516 of the airfoil 516. The leading edge section 520L extends between and interconnects the pressure side section 520P and the suction side section 520S and is arranged to form the leading edge 516L of the airfoil 516. Illustratively, the leading edge section 520L is continuous with the front face 521 of the platform. The aft end seam 531 is located at the trailing edge 516T and extends from the proximal end 522 to the distal end 523.

In the illustrative embodiments, the wraps 20, 220, 320, 420, 520 and cores 18, 218, 318, 418, 518 are a composite adapted to withstand very high operating temperatures that may not be possible for metallic components. More specifically, the wraps 20, 220, 320, 420, 520 and cores 18, 218, 318, 418, 518 may comprise a ceramic matrix composite (CMC). In some embodiments, the wraps 20, 220, 320, 420, 520 and cores 18, 218, 318, 418, 518 are made from a SiC—SiC ceramic matrix composite including a silicon carbide matrix and silicon carbide fibers. Of course, other suitable CMCs or composite combinations may be used.

Figure 8:
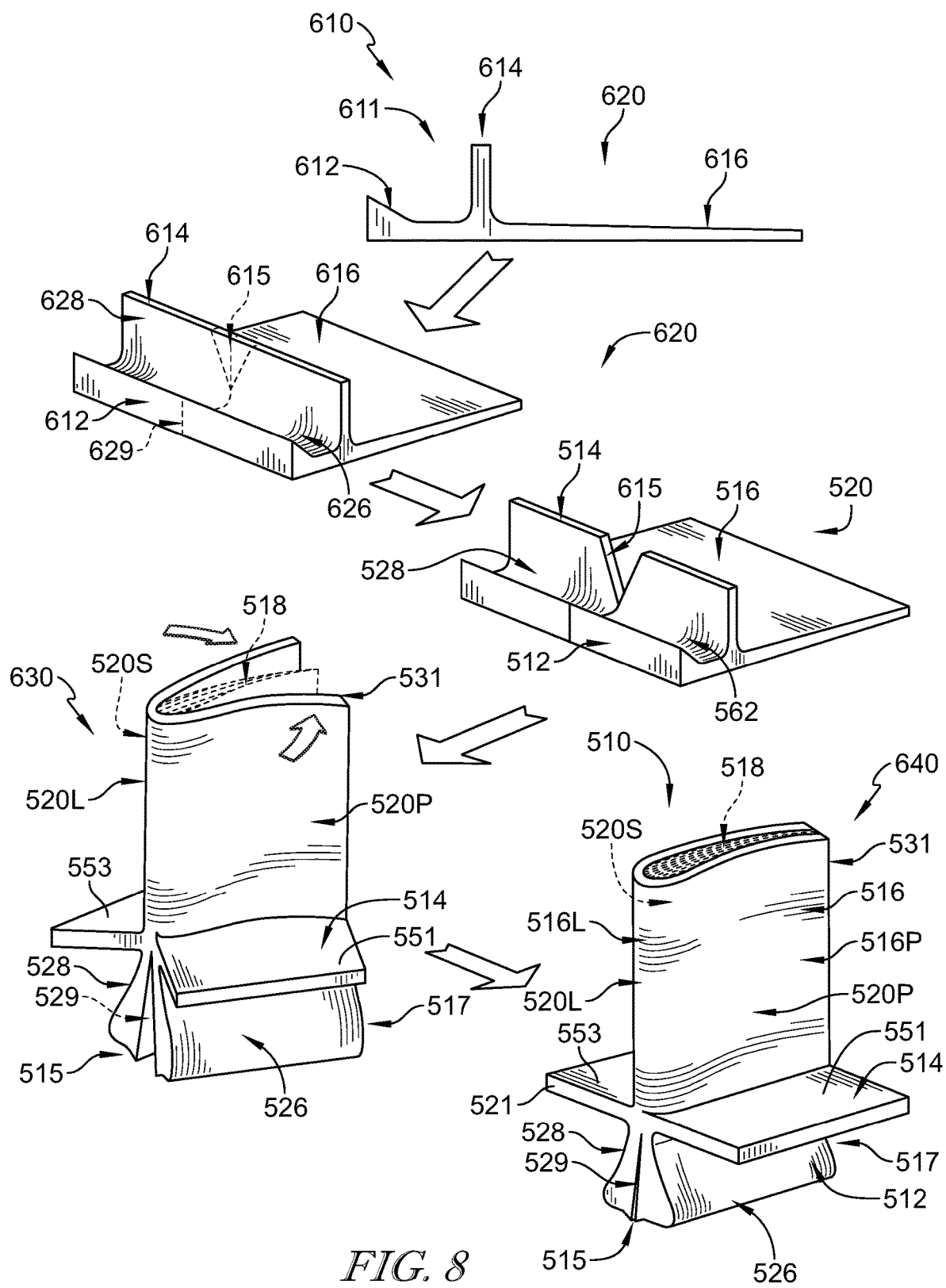
FIG. 8 is a series of perspective views showing of a method of forming the ceramic matrix composite blade shown in FIG. 7.

A method 600 of forming the ceramic matrix composite blade 510 may include forming 610 a sheet of three-dimensional woven fibers 611, removing 620 a portion of the sheet of three-dimensional woven fibers 611 to form a wrap preform 520, folding 630 the wrap preform 520 to form the forward seam 529 and the aft end seam 531, and processing 640 the wrap 520 to form the ceramic matrix composite blade 510, as shown in FIG. 8.

The step of forming 610 the sheet of three-dimensional woven fibers 611 may be performed by extruding the sheet 611. In some embodiments, the step of forming 610 the sheet of three-dimensional woven fibers 611 may be performed by weaving fibers to form the sheet 611. Any suitable alternatives to producing a fabric including three-dimensional woven fibers may also be used to form the sheet 611.

The sheet 611 includes a root portion 612, a platform portion 614, and an airfoil portion 616 as shown in FIG. 8. The root portion 612 is located spaced-apart from the airfoil portion 616 to locate the platform portion 614 therebetween. Illustratively, each of the root portion 612, the platform portion 614, and the airfoil portion 616 may have a different thickness. In some embodiments, each of the root portion 612, the platform portion 614, and the airfoil portion 616 may have a similar thickness.

The step of removing 620 a portion of the sheet of three-dimensional woven fibers 611 begins by identifying the shape of a groove 615 on the sheet 611 as shown in FIG. 8. Illustratively, the groove 615 may be pie-shaped, or triangular shaped. Alternatively, any shape suitable to form the ceramic matrix composite blade 510 may be cut in the sheet 611. In some embodiments, the groove 615 is pie shaped. In some embodiments, the step of removing 620 includes cutting the root portion 612 to form a root seam 629 to form the wrap 520, sometimes called a wrap preform 520.

The step of wrapping 630 the wrap preform 520 is shown in FIG. 8. The step of folding 630 includes folding the wrap preform 520 along the leading edge section 520L to bring inner surfaces of the pressure side section 520P and the suction side section 520S closer together. The step of wrapping 630 forms the forward seam of the root 512. In some embodiments, the step of wrapping 630 includes wrapping the wrap 520 around a core 518 to locate the core 518 between the suction side section 520S and the pressure side section 520P.

The step of forming 640 the ceramic matrix composite blade 510 may include processing the wrap 520. In some embodiments, the wrap 520 is processed to form the ceramic matrix. Illustrative techniques of forming the ceramic matrix include vapor infiltration, melt infiltration, sintering, and pyrolysis.

In illustrative embodiments, the ceramic matrix composite blade 10, 210, 310, 410, 510 includes an inner CMC (i.e. the core 18, 218, 318, 418, 518) constructed of traditional 2D fabric layup or unidirectional pre-preg layup. This provides a core of CMC material with fibers oriented in the radial direction, which is the predominant load direction, i.e. to carry centripetal loads.

In illustrative embodiments, the ceramic matrix composite blade 10, 210, 310, 410, 510 includes an outer CMC (i.e. the wrap 20, 220, 320, 420, 520) constructed of 3D woven material. This 3D woven outer cover (i.e. the wrap 20, 220, 320, 420, 520) is wrapped around the central layup core (i.e. the core 18, 218, 318, 418, 518). This enables complex geometry such as platforms (i.e. platform 14, 214, 314, 414, 514) tip shrouds (i.e. tip shroud sections 458, 456) in a cost-effective manner while minimizing the cost, weak points, and failure initiation sites in complex shapes.

Disclosed herein are multiple embodiments of how this concept could be implemented. Notably, machining (broaching) a dovetail slot in the disc at an angle would better align the dovetail with the center plane of the airfoil. In doing this, broaching at an angle (instead of axially, parallel to the engine centerline) would make this construction simpler.

Illustratively, FIGS. 1-6 show 3D weave surrounding the dovetail (i.e. the root 12, 212, 312, 412), creating the platforms (i.e. platform 14, 214, 314, 414,), and in some embodiments, extending up both sides of the airfoil (i.e. the airfoil 16, 416). In embodiments, the 3D weave (i.e. the wrap 20, 220, 320, 420, 520) could extend up only one side of the airfoil (i.e. the airfoil 16, 216, 316, 416, 516). In some embodiments, the 3D weave (i.e. the wrap 20, 220, 320, 420, 520) could stop at the platform (i.e. the platform 14, 214, 314).

In some embodiments, the 3D weave (i.e. the wrap 20, 220, 320, 420, 520) wraps around the bottom of the dovetail (i.e. the proximal end 22) and extends radially outward along either side of the airfoil 16, 216, 316, 416, 516. In some embodiments, the 3D weave piece (i.e. the wrap 520) wraps around the leading edge 516L of the airfoil 516 and extend axially rearward along either side (i.e. the suction side 516S and the pressure side 516P) of the airfoil 516. In some embodiments, a 3D weave piece (i.e. sheet 611) may be created by extruding a shape (i.e. the step of forming 610), cutting (i.e. darting, or the step of removing 620) the platform portion 614 of the extruded shape (i.e. sheet 611) to enable it to be wrapped around a leading edge of the 2D/1D core lay-up (i.e. core 518). In some embodiments, the extruded shape (i.e. sheet 611) may be uniform in thickness or could vary in thickness along the length. The cutting (i.e. darting, or the step of removing 620) could take multiple forms, from a simple cut to a pie shape or an inverse pie shape to allow some width as the 3D weave wraps around the leading edge of the core 518.

In some embodiments the core 18, 218, 318, 418, may be exposed at the front and aft face of the dovetail (i.e. the root 12) and at the tip of the airfoil (i.e. the distal end 23, 223, 323, 423, 523). In some embodiments, a platform ply 32 may be used to protect a top surface (i.e. surface 251, 253) of the platform 14 while adding strength to the construction by tying the two halves (i.e. first section 26 and third section 30) of the 3D weave construction together with a 2D ply (or plies) which span across the interface gap of the platform 14.

In some embodiments, the wrap 520 extends around the leading edge 516L of the airfoil 516. This construction would leave the bottom of the dovetail (i.e. the root 512) as discontinuous (i.e., the forward seam 529). As needed, 2D woven fabric or unidirectional pre-preg plies could be wrapped around the bottom of the dovetail (i.e. the root 512) and up either side, captured under the contact faces of the dovetail (i.e. the root 512). In this manner, the two sides (i.e. the first root section 526 and the second root section 528) of the 3D weave dovetail (i.e. the root 512) could be tied together.

In an effort to improve both fuel efficiency and thrust-to-weight, gas turbine manufacturers are constantly looking for materials that can handle higher temperatures and are capable of making parts lighter. A Ceramic Matric Composite (CMC) made from silicon carbide fibers and a silicon carbide matrix has the potential to accomplish both of these objectives simultaneously because the density of the CMC is approximately ⅓ that of single crystal nickel-based alloys and the CMC is capable of running at temperatures 100° F.-200° F. above that of the same single crystal alloys.

In some embodiments, woven/braided CMC airfoil (i.e. the ceramic matrix composite blade 10, 210, 310, 410, 510) could take the form of a turbine blade or vane. The reinforcement discussed herein could either have the fibers in the third direction traveling fully through the part from one face to the other, thus effectively tying all the layers together; or only partially through the thickness, tying adjacent layers to each other such as in an angle interlock pattern. The primary embodiment for a turbine blade (i.e. the ceramic matrix composite blade 10, 210, 310, 410, 510) would be an integrally formed, uncooled blade containing an airfoil (i.e. the airfoil 16, 216, 316, 416, 516), platform (i.e. the platform 14, 214, 314, 414, 514), stalk, and attachment (i.e. the root 12, 212, 312, 412, 512). The platform (i.e. the platform 14, 214, 314, 414, 514) would take the form of the inner flow path member, would protrude circumferential out from the airfoil (i.e. the airfoil 16, 216, 316, 416, 516), would be positioned between the airfoil (i.e. the airfoil 16, 216, 316, 416, 516) and attachment (i.e. the root 12, 212, 312, 412, 512) and may contain sealing features including, but not limited to, forward and aft rails and seal or damper pockets. In some embodiments, below the platform (i.e. the platform 14, 214, 314, 414, 514), a vertical section (stalk or shank) may be used to transition from the airfoil shape to the shape at the top of the attachment (i.e. the root 12, 212, 312, 412, 512). The attachment (i.e. the root 12, 212, 312, 412, 512) is currently envisioned as a single lobed dovetail attachment with flank angle between 45 and 75 degrees, it is possible for the flank angle to be lower.

According to methods in accordance with the present disclosure, the step of preforming (i.e. the step forming 610 and/or the step of removing 620) could allow the airfoil blade (i.e. the ceramic matrix composite blade 10, 210, 310, 410, 510) to be fabricated as a single piece preform that could be placed into tooling for fiber coating, if required, and densification without the need for additional assembly as is the case with some lay-ups. In preforming (i.e. the step of forming 610), a loom or braider capable of controlling the amount of and position of fiber in three axes is used. Fibers are added or dropped out of the preform (i.e. the sheet 611) via a control program in order to form the basis of the desired shape. With weaving, the amount of fiber can be controlled in each of the three directions. This could allow the material properties to be tailored throughout the airfoil (i.e. the ceramic matrix composite blade 10, 210, 310, 410, 510). As an example, a high fraction of radial fibers may be desired in the airfoil (i.e. the airfoil 16, 216, 316, 416, 516) while a more balanced fiber distribution, or even a high circumferential fraction, may be desired in the platform (i.e. the platform 14, 214, 314, 414, 514).

Additional embodiments of uncooled blades include the addition of a tip shroud (i.e. the ceramic matrix composite blade 410). This embodiment could be used either with or without a platform 414 and has the advantage of reducing the effects of vibration on the airfoil 416. This may be an advantage with high aspect ratio airfoils. The ability to include a tip shroud feature can also lead to improved engine efficiencies by reducing over tip leakage.

In some embodiments, the preform (i.e. the wrap 520) may be fabricated with a hollow cavity. This could be done as part of the normal preforming process or by using a mandrel. If a mandrel is used, it can be envisioned that it would need to be removed to produce the desired hollow cavity. Depending on the fabrication procedures adopted, the mandrel could be removed either part way thru the preforming process, at the end of preforming, or after rigidization. By including a hollow cavity in the airfoil (i.e. the airfoil 516), cooling air could be introduced into the airfoil (i.e. the airfoil 516) to allow operation at even higher temperatures.

One advantage that a woven or braided CMC has is that the inside surface of the cavity would be rough and could act as turbulators or features that would increase the transfer of heat from the airfoil (i.e. the airfoil 516) to the cooling air by either increasing the convective heat transfer coefficient or simply by increasing overall internal surface area. Air may exit the blade (i.e. the airfoil 516) via tip ejection or by film cooling holes that are formed or machined into the surface of the airfoil (i.e. the airfoil 516). In another embodiment, an impingement tube may be inserted into the airfoil (i.e. the airfoil 516) to increase further the heat transfer coefficient on the inner surface of the airfoil but also to appropriately distribute the cooling air within the inner cavity of the airfoil. The attachment portion of the airfoil (i.e. the airfoil 516) is desired to be axial to minimize localized stresses. However, it is possible and may be desirable to angle the attachment relative to the axis of the engine to better transmit the stresses from the airfoil (i.e. the airfoil 516) to the attachment or to aid in the manufacturability of the part. This would take the form of what is known as a broach angle and could be included with any of the aforementioned embodiments.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A ceramic matrix composite blade comprising a root, a platform, and an airfoil adapted for use in a gas turbine engine, a core having a proximal end and a distal end, the core comprising reinforcing fibers in a ceramic matrix material, and a wrap comprising three-dimensional reinforcing fibers in a ceramic matrix material, the wrap arranged to extend under the proximal end of the core to form an outer surface of the root and the wrap being configured to contact a disk when the ceramic matrix composite blade is assembled into a turbine wheel, and a platform ply arranged to overlie the platform without extending upwardly into the airfoil or downwardly into the root, wherein the wrap extends outwardly away from the core to form at least a portion of the platform, and wherein the core is exposed between a pressure-side section and suction side section of the wrap along a leading edge of the airfoil and wherein the core is exposed between a pressure-side section and suction side section of the wrap along a trailing edge of the airfoil.

2. The ceramic matrix composite blade of claim 1, wherein the platform ply comprises one of a one-dimensional ply of reinforcing fibers, a two-dimensional ply of reinforcing fibers, a three-dimensional ply of reinforcing fibers, a mat ply of reinforcing fibers, and a conversion layer.

3. The ceramic matrix composite blade of claim 2, wherein the platform ply is arranged to surround the airfoil and includes a slit joint that extends from the airfoil to an edge of the platform at a location having the smallest distance from the airfoil to the edge of the platform.

4. The ceramic matrix composite blade of claim 1, wherein the wrap further includes a pressure side section extending upwardly from the platform towards a distal end and a suction side section extending upwardly from the platform towards the distal end to locate a portion of the core therebetween.

5. The ceramic matrix composite blade of claim 4, wherein the wrap further includes a first tip shroud section located spaced-apart platform and extending outwardly away from the core.

6. The ceramic matrix composite blade of claim 4, further comprising an airfoil ply that extends around the leading edge of the airfoil forming a seam along the trailing edge of the airfoil, wherein the airfoil ply terminates at the platform and does not extend downwardly into the platform or root.

7. A ceramic matrix composite blade comprising a root, a platform, and an airfoil adapted for use in a gas turbine engine, a core having a proximal end and a distal end, the core comprising two-dimensional reinforcing fibers in a ceramic matrix material, and a wrap comprising three-dimensional reinforcing fibers in a ceramic matrix material, the wrap arranged to extend under the proximal end of the core to form an outer surface of the root and the wrap being configured to contact a disk when the ceramic matrix composite blade is assembled into a turbine wheel, wherein the wrap extends outwardly away from the core to form at least a portion of the platform, and wherein the two-dimensional reinforcing fibers of the core are unbalanced such that that the core includes more fibers that extend from the proximal end to the distal end of the core than fibers that across the core.

8. The ceramic matrix composite blade of claim 7, wherein the wrap includes a first section, a second section, and a third section that cooperate to extend around the proximal end of the core, the second section is arranged to extend under the proximal end of the core and extends between and interconnects the first section and the third section, and each of the first section and the third section extends upwardly away from the second section from the proximal end towards a distal end to locate the proximal end of the core therebetween.

9. A ceramic matrix composite blade comprising a root, a platform, and an airfoil adapted for use in a gas turbine engine, a core having a proximal end and a distal end, the core comprising reinforcing fibers in a ceramic matrix material, and a wrap comprising three-dimensional reinforcing fibers in a ceramic matrix material, the wrap arranged to extend under the proximal end of the core to form an outer surface of the root and the wrap being configured to contact a disk when the ceramic matrix composite blade is assembled into a turbine wheel, wherein the wrap includes a first section, a second section, and a third section that cooperate to extend around the proximal end of the core, the second section is arranged to extend under the proximal end of the core and extends between and interconnects the first section and the third section, and each of the first section and the third section extends upwardly away from the second section from the proximal end towards a distal end to locate the proximal end of the core therebetween, and wherein the second section includes a spreader extending into the proximal end of the core to locate a first portion of the core between the spreader and the first section of the wrap and a second portion of the core between the spreader and the third section of the wrap.

10. A ceramic matrix composite blade formed of comprising a wrap of three-dimensional woven reinforcement in a ceramic matrix composite, the wrap comprising:
   a root configured to be retained in a disk when the blade is assembled into a turbine wheel,
   a platform arranged to define a portion of a gas path, and
   an airfoil shaped to interact with air passing through the gas path,
   wherein the wrap is arranged to define a forward structural seam provided at an interface of ends of the wrap that extends along only the root and an aft structural seam provided at an interface of ends of the wrap that extends along the root, the platform, and the airfoil.

11. The ceramic matrix composite blade of claim 10, wherein the wrap is arranged to form a leading edge of the airfoil.

12. The ceramic matrix composite blade of claim 11, wherein the airfoil further includes an airfoil core located within the airfoil formed by the wrap.

13. The ceramic matrix composite blade of claim 12, wherein the airfoil core is formed of two-dimensional woven reinforcement in a ceramic matrix composite.

14. The ceramic matrix composite blade of claim 13, wherein the two-dimensional reinforcing fibers of the core are unbalanced such that that the core includes more fibers that extend from the proximal end to the distal end of the core than fibers that across the core.

* * * * *